April 23, 1929.  T. DIBSDALE  1,709,972
CASTER
Filed July 29, 1927
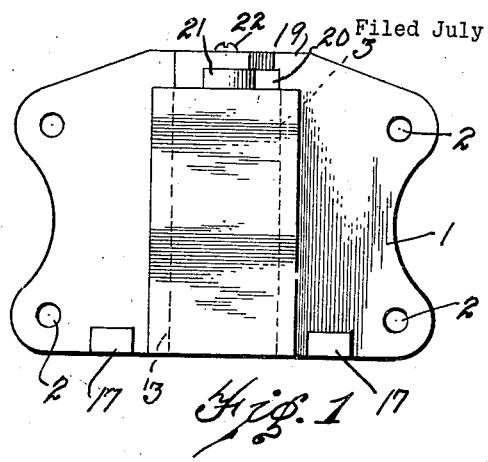
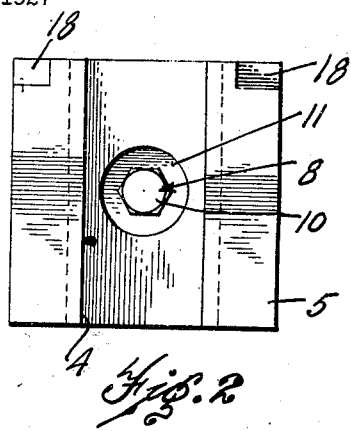
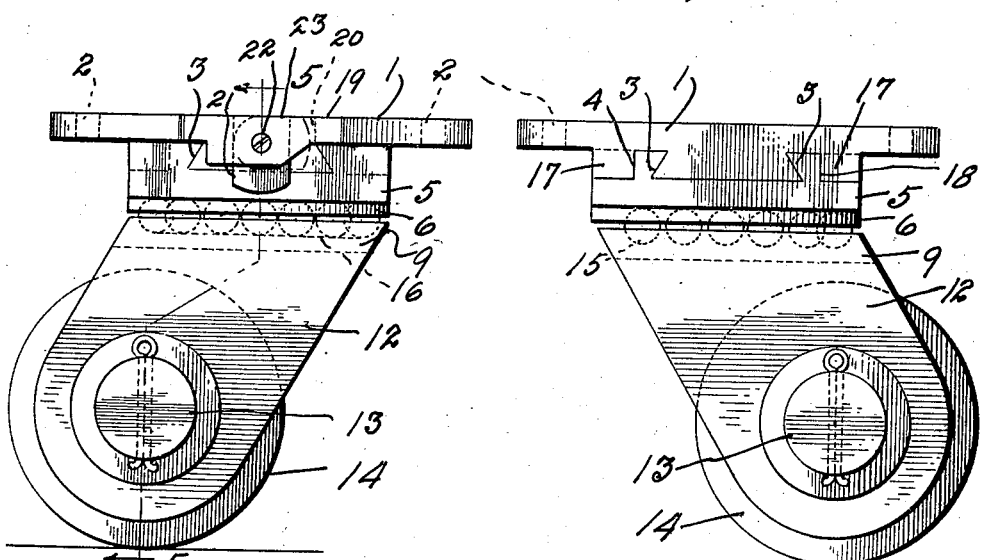
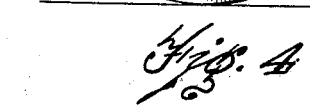
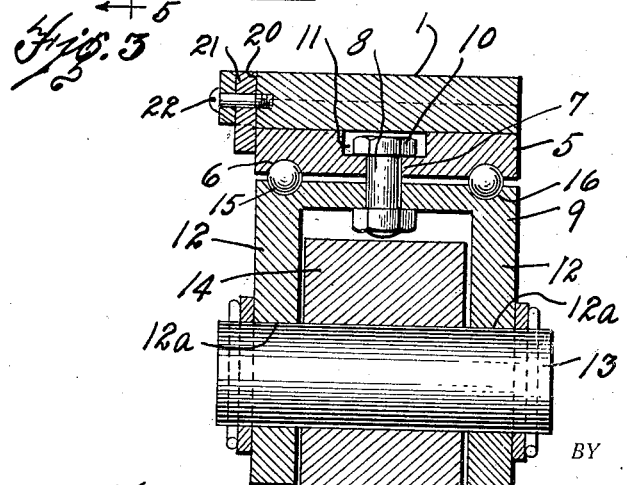
INVENTOR.
Thomas Dibsdale
BY
*Grau J. Baldwin*
ATTORNEY.

Patented Apr. 23, 1929.

1,709,972

UNITED STATES PATENT OFFICE.

THOMAS DIBSDALE, OF DETROIT, MICHIGAN, ASSIGNOR OF ONE-HALF TO GRANT WOODEY, OF DETROIT, MICHIGAN.

CASTER.

Application filed July 29, 1927. Serial No. 209,232.

This invention relates to improvements in casters. When put to certain uses, notably when employed under body trucks in automobile body factories, it is found that casters become damaged from time to time and have to be removed and others substituted. To accomplish this considerable time is required to remove the screws, or other fastening means, by which the caster is secured to a truck bottom and fasten another caster in position. Moreover while this work is being done the whole line of trucks is delayed.

It is an object of this invention to provide a caster having a supporting plate adapted to be dependingly secured to the underside of a truck, and a caster portion slidably mounted on the supporting plate so that in the event of the lower portion breaking the latter may be quickly removed and another substituted.

Another object of the invention is to provide a caster of the type above outlined which is cheap and easy to manufacture, and wherein simple means are provided for holding the lower caster portion in position on the supporting plate.

With these and other objects in view, which will become apparent as the specification proceeds, the invention is hereinafter more fully described with the aid of the accompanying drawings, in which:

Figure 1 illustrates an inverted plan of the supporting plate.

Figure 2 shows a plan view of the intermediate plate.

Figures 3 and 4 are side elevations of the caster, and

Figure 5 is a section on the line 5—5 of Figure 3.

Referring to the drawings, 1 designates a supporting plate which is usually provided with holes 2 therethrough so that it may be secured to the underside of an article such as a truck body—not shown. On the underside of the plate 1 is a downwardly projecting lateral guide 3, the sides of which are downwardly and outwardly inclined to receive the correspondingly bevelled sides of a slide on the upper surface of the intermediate plate 5. The latter is provided on its underside with a ball race 6 and has a substantially central hole 7 therethrough for a bolt 8 by which the said intermediate plate is secured to a lower portion 9. The head 10 of the bolt 8 is preferably located in a counterbore 11 in the upper side of the intermediate plate.

The sides of the lower portion 9 are usually downturned as shown at 12 through these sides opposed openings 12$^a$ are provided to receive a pin 13 on which a roller 14 is revolvably mounted. The upper surface of the lower portion 9 is also provided with a ball race 16 to support the underside of the balls 15, the upper portions of which latter rotate against the ball race 6.

In order to prevent the slide 4 from moving laterally off the guide 3 it is necessary to provide stops at the ends of the guide. For this purpose I usually form downwardly projecting lugs 17 on the inner side of the supporting plate which take into corresponding recesses 18 in the upper surface of the intermediate plate when the latter is in position, thereby holding the latter against further movement in one direction. On the opposite side of the supporting plate and above the guide 3 is an outwardly extending portion 19 which tapers inwards towards both ends of the plate. Substantially centrally through this projecting portion is a vertical slot 20 in which a catch 21 is pivotally mounted on a pin 22 which passes through the projecting portion 19 and takes into the side of the supporting plate. When this catch is downturned it engages one side, usually the outer side, of the slide on the intermediate plate, thereby holding the lower portion of the caster against lateral movement; and when the catch is upturned the intermediate plate is free to be removed. The catch 21 usually has a marginal portion 23 so formed that the former can only be turned through approximately ninety degrees so as to insure it always remaining in such a position as to be readily accessible.

While in the foregoing the preferred embodiment of the invention has been described and shown, it is understood that the construction is susceptible to such modifications as fall within the scope of the appended claim.

What I claim as my invention and desire to secure by Letters Patent is:

A caster comprising a supporting plate adapted to be dependingly secured to an article, a guide having downwardly and outwardly inclined sides transversely arranged on the underside of said supporting plate, an intermediate plate having a slide thereon slidable on said guide, an outwardly projecting portion on one side of said supporting plate having a vertical slot therethrough, a catch pivotally mounted in said slot adapted to hold said slide and intermediate plate against movement on said guide in one direction, means for limiting the movement of said slide and intermediate plate in the opposite direction on said guide, said intermediate plate having a ball race in its under surface, a lower portion having a ball race in its upper surface and pivotally secured under said intermediate plate, balls supported between said ball races, said lower portion having downturned sides, said sides having opposed openings therethrough, a pin supported in said openings, and a roller revolvably mounted on said pin.

THOMAS DIBSDALE.